US008769533B2

(12) United States Patent
North

(10) Patent No.: US 8,769,533 B2
(45) Date of Patent: Jul. 1, 2014

(54) CHECK-POINT BASED HIGH AVAILABILITY: NETWORK PACKET BUFFERING IN HARDWARE

(75) Inventor: Geraint North, Manchester (GB)

(73) Assignee: International Business Machines Corporation, Armonk, NY (US)

(*) Notice: Subject to any disclaimer, the term of this patent is extended or adjusted under 35 U.S.C. 154(b) by 164 days.

(21) Appl. No.: 13/184,740

(22) Filed: Jul. 18, 2011

(65) Prior Publication Data

US 2013/0024855 A1   Jan. 24, 2013

(51) Int. Cl.
*G06F 9/455* (2006.01)

(52) U.S. Cl.
USPC .............................................. 718/1; 709/238

(58) Field of Classification Search
None
See application file for complete search history.

(56) References Cited

U.S. PATENT DOCUMENTS

| 6,075,938 | A  | * | 6/2000  | Bugnion et al. ............... 703/27 |
| 6,795,966 | B1 | * | 9/2004  | Lim et al. ...................... 718/1 |
| 7,529,897 | B1 | * | 5/2009  | Waldspurger et al. ........ 711/162 |
| 7,533,229 | B1 | * | 5/2009  | van Rietschote ............. 711/161 |
| 2006/0143217 | A1 | * | 6/2006  | Stanev et al. ................. 707/102 |
| 2006/0150010 | A1 | * | 7/2006  | Stiffler et al. ................ 714/13 |
| 2007/0174484 | A1 | * | 7/2007  | Lussier et al. ............... 709/238 |
| 2007/0226214 | A1 | * | 9/2007  | Smits ............................. 707/7 |
| 2008/0005792 | A1 | * | 1/2008  | Larson et al. ................. 726/15 |
| 2008/0028198 | A1 | * | 1/2008  | Duron et al. .................. 713/1 |
| 2008/0177994 | A1 | * | 7/2008  | Mayer .......................... 713/2 |
| 2008/0267176 | A1 | * | 10/2008 | Ganesh et al. ............... 370/389 |
| 2009/0109975 | A1 | * | 4/2009  | Sindhu et al. ................ 370/392 |
| 2009/0183180 | A1 | * | 7/2009  | Nelson ......................... 719/319 |
| 2009/0217021 | A1 | * | 8/2009  | Goodson et al. .............. 713/1 |
| 2009/0238190 | A1 | * | 9/2009  | Cadigan et al. ........... 370/395.53 |
| 2009/0238197 | A1 | * | 9/2009  | Cadigan et al. .............. 370/412 |
| 2009/0248922 | A1 | * | 10/2009 | Hinohara et al. .............. 710/56 |
| 2010/0070677 | A1 | * | 3/2010  | Thakkar ........................ 711/6 |
| 2010/0107158 | A1 | * | 4/2010  | Chen et al. .................... 718/1 |
| 2010/0250824 | A1 | * | 9/2010  | Belay ........................... 711/6 |
| 2011/0167196 | A1 | * | 7/2011  | Scales et al. .................. 711/6 |
| 2011/0173289 | A1 | * | 7/2011  | Chen et al. .................. 709/212 |
| 2011/0289345 | A1 | * | 11/2011 | Agesen et al. ............. 714/4.11 |
| 2011/0314469 | A1 | * | 12/2011 | Qian et al. .................... 718/1 |
| 2012/0204061 | A1 | * | 8/2012  | Agesen et al. ............... 714/15 |
| 2012/0275459 | A1 | * | 11/2012 | Ferguson et al. ............ 370/392 |
| 2012/0331250 | A1 | * | 12/2012 | Nelson ........................ 711/162 |

OTHER PUBLICATIONS

Intellectual Property Office; Application No. GB1208269.9; Combined Search and Examination Report (5 pp.) dated Aug. 10, 2012.
Cully et al, "Remus: High Availability via Asynchronous Virtual Machine Replication," http://www.usenix.org/event/nsdi08/tech/full_papers/cully/cully_html/, Apr. 2008.
Petrovic, Darko, "Virtual Machine Replication," EDIC Research Proposal, May 5, 2009, pp. 1-8.

* cited by examiner

*Primary Examiner* — Emerson Puente
*Assistant Examiner* — Mehran Kamran
(74) *Attorney, Agent, or Firm* — Yudell Isidore Ng Russell PLLC

(57) ABSTRACT

A method, system, and computer program product enhances resource/process availability by providing hardware based buffering of network packets during checkpointing in a virtualized environment. A High Availability Checkpoint (HAC) utility pre-configures a physical network adapter to buffer outgoing network packets from virtual machines that employ a checkpointing technology. In response to receiving an outgoing network packet from a virtual machine and determining that the virtual machine employs a pre-specified checkpointing technology, the physical network adapter buffers the outgoing network packet. In addition, a primary host performs/facilitates checkpoint operations (associated with the virtual machine) with a secondary host. When checkpoint operations are successfully completed, the HAC utility triggers the transmission of the buffered network packets from the network adapter to a network destination. The physical network adapter minimizes checkpointing network latency by pre-assigning a higher priority to a buffered network packet from a checkpointing virtual machine than to a new network packet that originates from a non-checkpointing virtual machine.

20 Claims, 5 Drawing Sheets

CHECK-POINT BASED HIGH AVAILABILITY: NETWORK PACKET BUFFERING IN HARDWARE

BACKGROUND

1. Technical Field

The present invention relates in general to data processing systems and in particular to checkpoint operations within a data processing system. Still more particularly, the present invention relates to checkpoint operations with network packet buffering within a data processing system.

2. Description of the Related Art

Checkpoint-based High-Availability is a methodology whereby a virtual machine running on a host machine (i.e., the "primary host") regularly (e.g., at 25 ms intervals) mirrors the corresponding CPU and memory state onto another host machine (i.e., the "secondary host"). This mirroring process involves: (1) tracking changes to the memory of the virtual machine; (2) periodically stopping the virtual machine; (3) sending these changes along with CPU state update changes over a network to the secondary host; (4) waiting for the secondary host to acknowledge receipt of the memory and CPU state update; and (5) resuming the virtual machine. The mirroring/"checkpointing" process ensures that the secondary host is able to resume the workload with no loss of service should the primary host suffer a sudden hardware failure.

With respect to the transmission of network packets in conventional checkpointing approaches, virtual machines generally proxy network traffic through a single virtualization point (e.g. a virtual input/output server (VIOS) or a hypervisor) that "owns" the network adapter. These conventional approaches generally require that a checkpoint is performed on every network packet transmission. As a result, the network latency increases and software complexity is introduced by these conventional approaches.

BRIEF SUMMARY

Disclosed are a method, system, and computer program product for enhancing resource/process availability by providing hardware based buffering of network packets during checkpointing in a virtualized environment. A High Availability Checkpoint (HAC) utility pre-configures a physical network adapter to buffer outgoing network packets from virtual machines that employ a checkpointing technology. In response to receiving an outgoing network packet from a virtual machine and determining that the virtual machine employs a pre-specified checkpointing technology, the physical network adapter buffers the outgoing network packet. In addition, a primary host performs/facilitates checkpoint operations (associated with the virtual machine) with a secondary host. When checkpoint operations are successfully completed, the HAC utility triggers the transmission of the buffered network packets from the network adapter to a network destination. The physical network adapter minimizes checkpointing network latency by pre-assigning a higher priority to a buffered network packet from a checkpointing virtual machine than to a new network packet that originates from a non-checkpointing virtual machine The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The described embodiments are to be read in conjunction with the accompanying drawings, wherein.

DETAILED DESCRIPTION

Figure 1:
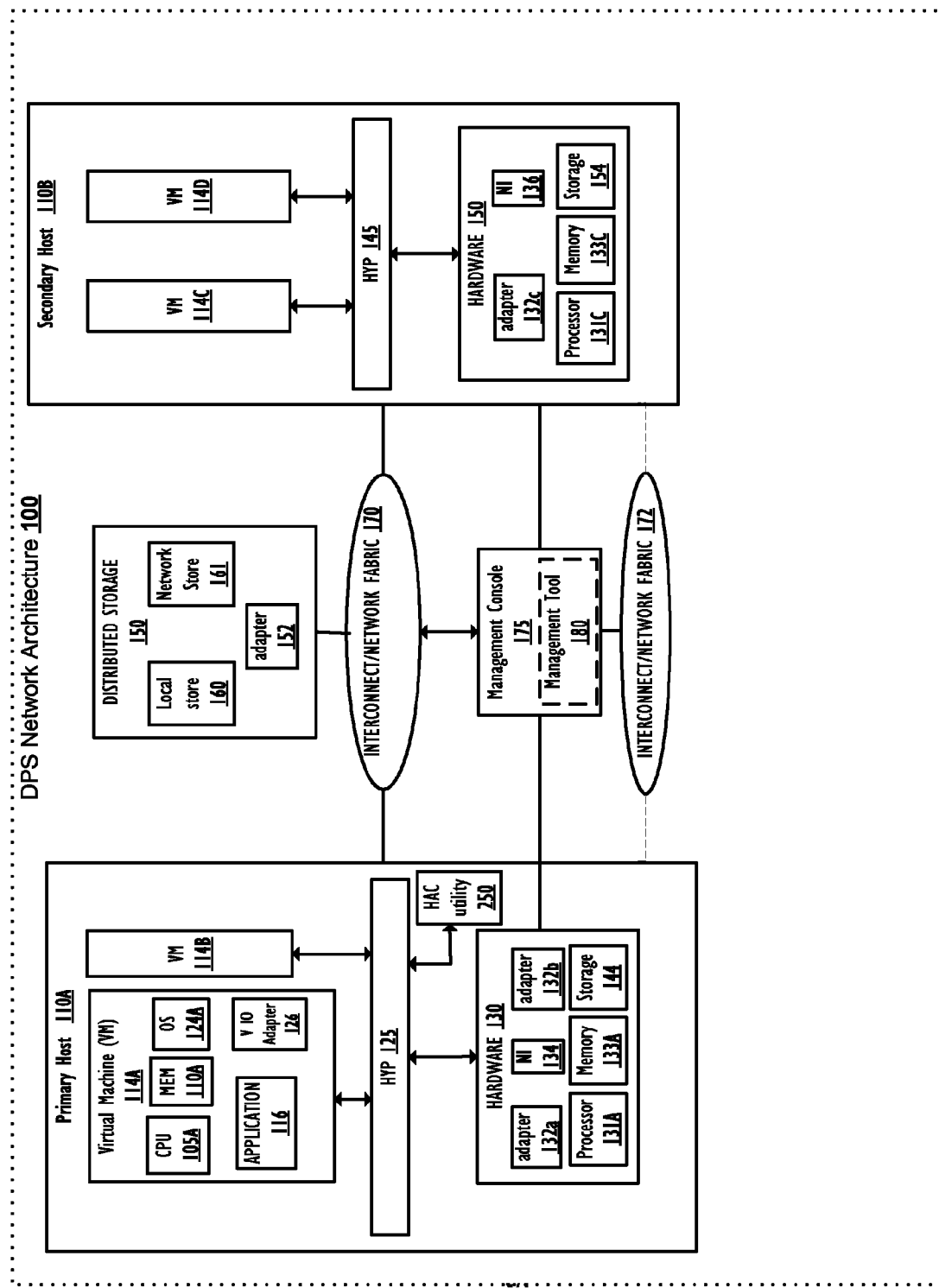
FIG. 1 illustrates a network of data processing systems configured as virtualized systems within which various of the functional features of the described embodiments are implemented, according to one embodiment.

The illustrative embodiments provide a method, data processing system, and computer program product for enhancing resource/process availability by providing hardware based buffering of network packets during checkpointing in a virtualized environment. A High Availability Checkpoint (HAC) utility pre-configures a physical network adapter to buffer outgoing network packets from virtual machines that employ a checkpointing technology. In response to receiving an outgoing network packet from a virtual machine and determining that the virtual machine employs a pre-specified checkpointing technology, the physical network adapter buffers the outgoing network packet. In addition, a primary host performs/facilitates checkpoint operations (associated with the virtual machine) with a secondary host. When checkpoint operations are successfully completed, the HAC utility triggers the transmission of the buffered network packets from the network adapter to a network destination. The physical network adapter minimizes checkpointing network latency by pre-assigning a higher priority to a buffered network packet from a checkpointing virtual machine than to a new network packet that originates from a non-checkpointing virtual machine In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention.

The following detailed description is, therefore, not to be taken in a limiting sense, and the scope of the present invention is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names (such as those of the executing utility/logic/firmware described herein) are for example only and not meant to imply any limitations on the invention. The invention may thus be implemented with different nomenclature/terminology utilized to describe the components/devices/parameters herein, without limitation. References to any specific protocol or proprietary name in describing one or more elements, features or concepts of the embodiments are provided solely as examples of one implementation, and such references do not limit the extension of the invention to embodiments in which different element, feature or concept names are utilized. Thus, each term utilized herein is to be given its broadest interpretation given the context in which that terms is utilized.

As further described below, implementation of the functional features of the invention is provided within processing devices/structures and involves use of a combination of hardware, firmware, as well as several software-level constructs (e.g., program code). The presented figures illustrate both hardware components and software components within example data processing architecture having a number of processing nodes arranged/configured as one or more computing electronic complexes. The illustrative and described embodiments assume that the system architecture may be scaled to a much larger number of processing nodes.

With specific reference now to FIG. 1, there is depicted a block diagram of an example architecture (100) for a network of virtualized data processing systems (DPS), within which the functional aspects of the described embodiments may advantageously be implemented. For simplicity, the DPS network architecture (100) shall be referred to herein simply as DPS 100. DPS 100 comprises a plurality of host computer devices, of which primary host 110A and secondary host 110B are illustrated. The number of host devices within DPS 100 may vary, ranging from a single host device in a smaller system extending up to hundreds or thousands of host devices, in larger scaled systems. For simplicity, the embodiments shall be described from the perspective of a single host device (primary host 110A) or two host devices (primary host device 110A, secondary host device 110B). Provided within each Host System 110A-110B are virtual machines of which a first two virtual machines, VM 114*a* and VM 114*b*, and VM 114*c* and VM 114*d* are illustrated, respectively. As described below, with reference to FIG. 2, VMs 114 are logical partitions of a virtualized (or operating system partitioned) computing system. The actual number of clients/virtual machines within each host device 110 may vary and could range from a single client/virtual machine to hundreds or thousands of clients/virtual machines, without limitation. For efficiency in presenting the inventive concepts herein, only two clients/virtual machines are presented within each host device 110 of the various illustrative and described embodiments.

DPS 100 also comprises a distributed (shared) storage facility, accessible to each of the (computer) host systems/devices 110 and the components within the host systems 110.

In one embodiment, primary host 110A and secondary host 110B can both access the distributed storage facility. In another embodiment, the primary host and the secondary host access separate/distinct storage facilities.

Each host device 110 within DPS 100 connects to distributed storage 150 via one or more networks and/or I/O interconnect/switch fabric (generally illustrated as interconnect/network fabric 170). The descriptions and illustrations assume that at least some of the host devices (110) of DPS 100 and distributed storage 150 can be located remotely from each other, including being located in different countries, for example, such that no direct physical connectivity is necessarily required between the respective devices. For simplicity, the embodiments are described as having primary interconnect/network 170 comprising a private wide area network (WAN) or a public WAN (such as the Internet), although other network types (e.g., a local area network) are possible and supported.

As depicted, in one or more embodiments, each host device (e.g., primary host 110A) is also connected to one or more neighbor host devices (e.g., secondary host 110B), in order to provide efficient fail-over and/or mobility support and other functions, as described hereinafter. As utilized herein, the term neighbor refers to a connected second host device with which a first host device is able to communicate, and references to a neighbor host device is not limited to a second host device in geographic proximity to the first host device. Primary host 110A and secondary host 110B are illustrated connected to each other via some connecting medium, which may include a different network (such as a local area network) 172 or some type of direct interconnect (e.g., a fiber channel connection) when physically close to each other. The connection between neighbor primary host 110A and secondary host 110B is illustrated as a direct line connection or a secondary network connection (172) between primary host 110A and secondary host 110B. However, it is appreciated that the connections are not necessarily direct, and may actually be routed through the same general interconnect/network 170 as with the other host system connections to distributed storage 150.

As depicted, each host system 110 comprises one or more network interfaces 134 and one or more I/O adapters 132 to enable the host system 110 and thus the other components (i.e., virtual machines) of the host system 110 to engage in network level communication. Hardware components 130 of example primary host 110A include one or more processors (e.g., 131A), one or more memories (e.g., 133A), and local storage 144. The processors are interconnected with one or a plurality of memories and with local storage 144 via a bus, interconnect/switch or an interconnect fabric (not specifically shown). Each virtual machine, e.g., VM 114A, receives an allocation of specific virtualized hardware and OS resources, including virtualized CPU 105A, Memory 110A and OS 114A. Application 116 executes on VM 114A. Each VM 114 includes a respective host operating system 114 that controls low-level access to hardware layer (130) of primary host 110A and/or to virtualized I/O functions and/or services. In addition, HAC utility 250 executes on primary host 110A and is communicatively connected to hypervisor (HYP) 125. In one embodiment, HAC utility 250 is integrated within HYP 125. In one embodiment, management console 175 is utilized to perform the setup and/or initialization of checkpointing operations described herein for the individual VMs 114 and/or of the network as a whole, in various embodiments.

In DPS 100, Single Root IO Virtualization technology (i.e., SR-IOV) is capable of providing network adapter functionality to executing virtual machines. In particular, SR-IOV technology is employed to allow a single physical network adapter (e.g., network adapter/interface 134) to be represented to the host system (e.g., primary host 110A) as a large number of individual network adapters. In one embodiment, this large number of (conceptual/virtual) individual network adapters are represented by virtual adapters/"functions" assigned to each virtual machine. As a result, network resources may be assigned to a number of virtual machines (i.e., client logical partitions) running on the same host, allowing each virtual machine to communicate directly with the network hardware while still allowing sharing of the adapter between virtual machines. Furthermore, the SR-IOV adapter is aware of the existence of different virtual machines and the individual traffic originating from respective virtual machines.

Figure 2:
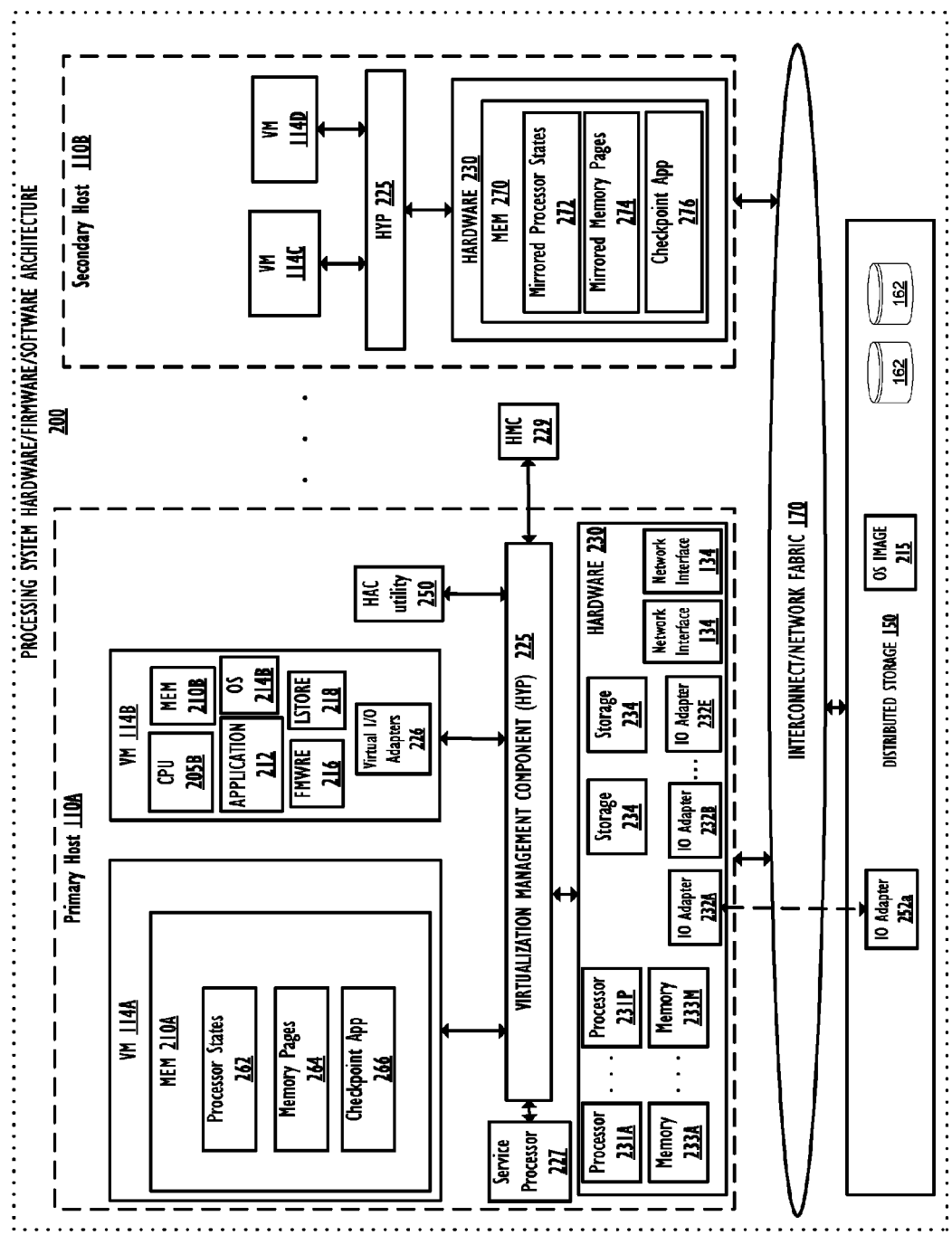
FIG. 2 illustrates an internal configuration of a primary host having several virtual machines, according to one embodiment.

With reference now to FIG. 2, there is presented another view of an example DPS 100, emphasizing a virtualized processing system architecture 200 (i.e., architecture of the individual host systems, and specifically primary host 110A). Primary host 110A serves as the example host system and is described in greater detail in FIG. 2 and throughout the specification. Primary host 110A is presented as a server that comprises hardware components and software/firmware/OS components that are logically partition to create a plurality of virtualized machine partitions, which are assigned as virtual machines (VMs). Hardware components 230 of example primary host 110A comprise one or more processors 231A-231P, one or more memories 233A-233M, and local storage 234. The processors 231A-231P are interconnected with one or a plurality of memories 233A-233M and with local storage 234 via a bus, interconnect/switch or an interconnect fabric (not specifically shown). The specific internal connectivity of components, which may be distributed across a large scale interconnect fabric, is not germane to the described embodiments, and no further detail is presented regarding the particular type of interconnectivity between the system hardware components.

Also included within hardware components 230 are one or more physical network interfaces 134 by which primary host 110A connects to an external network, such as network 170, among others. Additionally, hardware components 230 comprise a plurality of I/O adapters 232A-232E, which provides the I/O interface for primary host 110A. I/O adapters 232A-232E are physical adapters that enable primary host 110 to support I/O operations via an I/O interface with both locally connected and remotely (networked) connected I/O devices, including Distributed Storage 150. Examples of I/O adapters include Peripheral Component Interface (PCI), PCI-X, or PCI Express Adapter, and Small Computer System Interconnect (SCSI) adapters, among others. Host system 110 is logically partitioned such that different I/O adapters 232 are virtualized and the virtual I/O adapters can then be uniquely assigned to different logical partitions. In one or more embodiments, configuration data related to the virtualized adapters and other components that are assigned to the VMs are maintained within each VM and can be maintained and updated by the VM, as changes are made to such configurations and as adapters are added and/or removed and/or assigned.

Logically located above the hardware level (230) is a virtualization management component, provided as a Hypervisor (HYP) 225, as one embodiment. While illustrated and described throughout the various embodiments as HYP 225, it is fully appreciated that other types of virtualization management components may be utilized and are equally applicable to the implementation of the various embodiments.

HYP 225 has an associated service processor 227 coupled thereto within host system 110. Service processor 227 may be used to provide various services for one or more logical partitions. HYP 225 is also coupled to hardware management controller (HMC) 229, which exists outside of the physical host system 110. HMC 229 is one possible implementation of the management console 175 illustrated by FIG. 1. The use of HMC 229 specifically within this illustration is solely for illustration of one actual embodiment among several available options. Operations of the different logical partitions can be controlled through HMC 229, which is a separate data processing system from which a system administrator may perform various functions, such as reallocation of resources to different logical partitions. Importantly, features related to failover of OS partitions and in particular of the virtual machines and the data processing network are set up through the HMC, in the present embodiment.

Primary host 110A further comprises a plurality of client-level virtual machines (VMs), of which a first two are shown, represented as individual VMs 114A-114B within primary host 110A. According to the various illustrative embodiments, primary host 110A supports multiple clients and other functional operating OS partitions that are "created" within a virtualized environment. Each VM, e.g., VM 114B, receives an allocation of specific virtualized hardware and OS resources, including virtualized CPU 205B, Memory 210B, OS 214B, local firmware 216 and local storage (LStore) 218. According to the presently described embodiments, first VM 114A comprises MEM 210A which includes processor states 262, memory pages 264 and checkpoint application 266, which are all utilized and/or exchanged in checkpoint related operations with secondary host 110B. In particular, secondary host 110B contains copies of memory pages and processor states of first VM 114A, as of a previous checkpointing operation, as illustrated by mirrored processor states 272 and mirrored memory pages 274 in MEM 270. MEM 270 also includes checkpoint application 276 to enable secondary host 110B to participate in checkpoint operations with the primary host 110A. Each VM 114 includes a respective host operating system 214 that controls low-level access to hardware layer (230) of primary host 110A and/or to virtualized I/O functions and/or services. In one embodiment, the operating system(s) may be implemented using IBM i available from International Business Machines Corporation (or other virtualization operating system), which is designed to interface with a partition management firmware, such as HYP 225. It is appreciated that other types of operating systems (such as Advanced Interactive Executive (AIX) operating system, a trademark of IBM Corporation, or GNU®/Linux®, registered trademarks of Linus Torvalds) for example, may be utilized, depending on a particular implementation, and IBM i is used only as an example.

Those of ordinary skill in the art will appreciate that the hardware, firmware/software utility, and software components and basic configuration thereof depicted in FIGS. 1 and 2 may vary. The illustrative components of DPS 100 and specifically those within primary host 110A, first VM and second VM are not intended to be exhaustive, but rather are representative to highlight some of the components that are utilized to implement certain of the described embodiments. For example, different configurations of data processing systems/host devices may be provided, containing other devices/components, which may be used in addition to or in place of the hardware depicted, and may be differently configured. The depicted example is not meant to imply architectural or other limitations with respect to the presently described embodiments and/or the general invention. The host device 110 depicted in the various figures may be, for example, an IBM eServer pSeries system, a product of International Business Machines Corporation in Armonk, N.Y., running the Advanced Interactive Executive (AIX) operating system or LINUX operating system.

According to the presently described embodiments, a High Availability Checkpoint (HAC) utility (250) executes within first host device 110A (i.e., a primary host) to enable support for performance of checkpoint operations for a particular virtual machine. In addition, a separate module of HAC utility 250 executes on secondary host 110B to provide support for checkpoint operations with primary host 110A. The HAC utility 250 pre-configures network adapter 134 to buffer outgoing packets from virtual machines that employ a checkpointing technology. The HAC utility 250 receives from one or more virtual machines running on a primary host, configuration information that provides an indication that the virtual machines employ a checkpointing technology, respectively. The network adapter determines whether an outgoing network packet sent by a first virtual machine originates from a virtual machine that employs checkpointing technology. If the first virtual machine does employ checkpointing technology, one or more VMs on primary host 110A initiates checkpoint operations with secondary host 110B in order to mirror memory data and CPU state update data of the first virtual machine to (a second virtual machine on) secondary host 110B. The checkpointing operation is facilitated by the hypervisor and/or network adapter 134, which enables communication between the primary host and secondary host 110B. When checkpoint operations are successfully completed, HAC utility 250 sends a checkpoint command to physical network adapter 134 associated with the virtual machine to trigger release/transmission of the buffered network packets from the network adapter to a (remote and/or local) network destination. Network adapter 134 (through the use of SR-IOV technology) is aware of the existence of different virtual machines and the individual traffic originating from these virtual machines. For example, each "virtual function"/virtual adapter 226 is assigned a different MAC address, so the physical network adapter 134 is able to route incoming packets to the correct virtual function/virtual adapter 226 and deliver interrupts to the correct virtual machine.

HAC utility 250 provides code/program instructions that are executed on one or more virtual processor resources of one or more VMs 114 within host devices 110 to provide specific functions. Among the functionality provided when HAC utility 250 is executed and which are described in greater detail herein are the following non exclusive list: (a) pre-configuring an SR-IOV adapter to buffer outgoing network packets originating from the virtual machine employing checkpointing technology; (b) receiving, from one or more virtual machines running on a primary host, configuration information that indicates that the one or more virtual machines employ a checkpointing technology; (c) in response to the initiation of transmission of a current outgoing network packet by a virtual machine, determining, via the SR-IOV adapter, whether the current outgoing network packet originates from a virtual machine that employs a checkpointing technology; (d) in response to determining that the current outgoing network packet originates from a virtual machine that employs a checkpointing technology, buffering, via the SR-IOV adapter, the outgoing network packet from the virtual machine; (e) initiating a set of checkpoint operations with a secondary host; and (f) when a checkpointing operation has successfully completed, triggering, using a checkpoint command, transmission/release of the buffered network packet from the network adapter to a destination within a corresponding network. In one embodiment, several of the above series of functions are enabled and/or performed by network adapter 134 in communication with the hypervisor and one or more VMs. Network adapter 134 facilitates the performance of a checkpointing operation of one or more VMs by supporting/enabling the cross communication between host devices.

Figure 3:
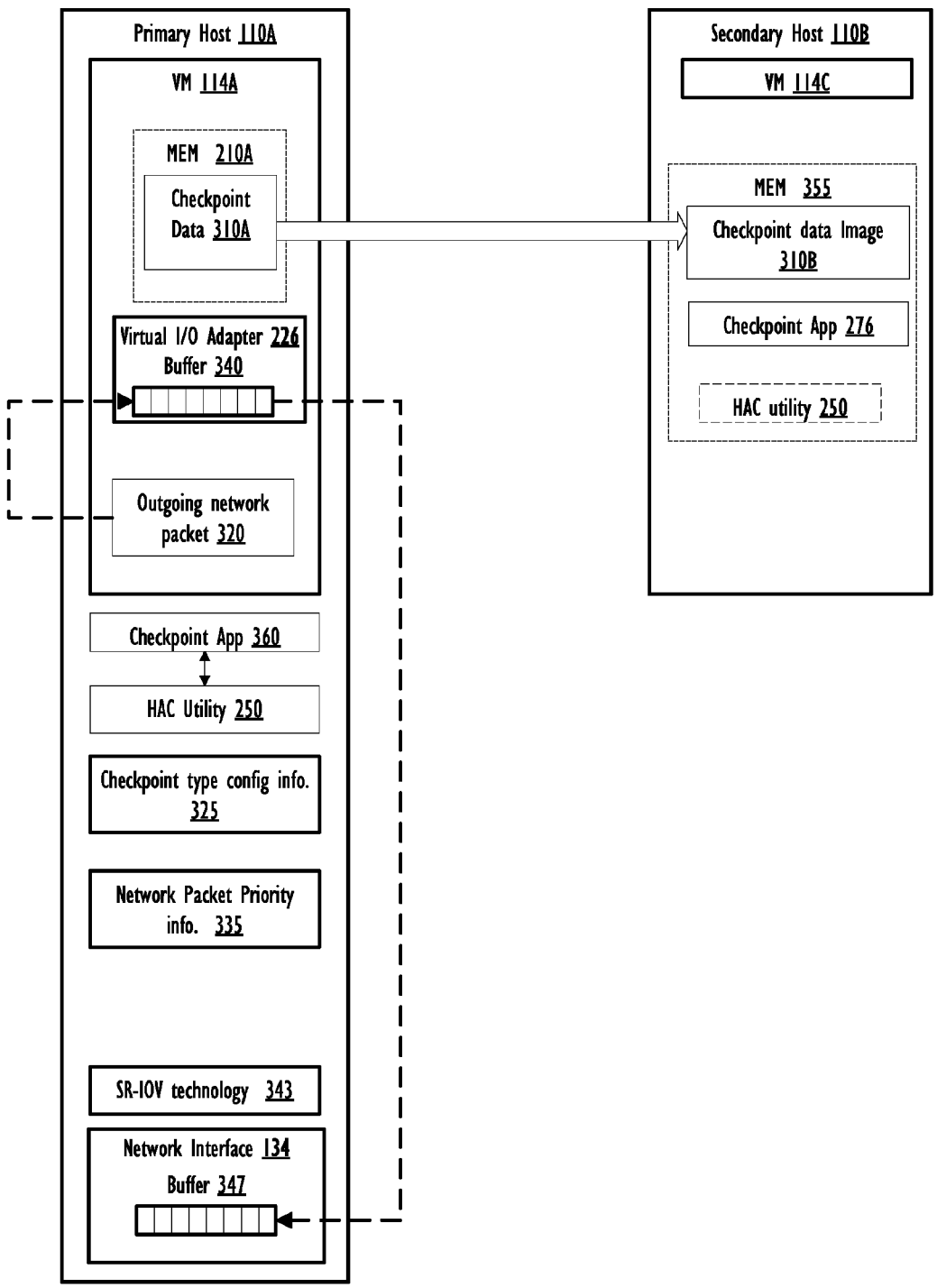
FIG. 3 illustrates a block diagram representation of functional components of a primary host and a secondary host, which hosts are both configured to enable checkpoint operations for a virtual machine executing on the primary host, according to one embodiment.

Turning now to FIG. 3, there is illustrated a block diagram representation of functional components of a primary host and a secondary host, which hosts are both configured to enable checkpoint operations for a virtual machine executing on the primary host, according to one embodiment. Network of data processing systems (DPS) 300 comprises primary host 110A and secondary host 110B. Provided within primary host 110A is first virtual machine (VM) 114A. Illustrated within first VM 114A are MEM 210A and virtual I/O adapter 226. Virtual I/O adapter 226 comprises dedicated buffer 340. Also shown in VM 114A is outgoing network packet 320. Primary host 110A also comprises physical network adapter/interface 134. Network adapter 134 comprises buffer 347. In one embodiment, buffer 347 represents a global buffer. Checkpoint application 360 is also illustrated within primary host 110A. SR-IOV technology software/module 343 is also shown with primary host 110A. Checkpoint technology type information 325 and network packet priority information 335 are also shown within primary host 110A. Also included in primary host 110A is network adapter 134. In one embodiment, network adapter 134 is configured to support Single Root IO Virtualization technology (i.e., SR-IOV). SR-IOV allows a single physical network adapter to be represented to the host system (e.g., primary host 110A) as a large number of individual network adapters ("virtual functions"). These "virtual functions" are illustrated as virtual I/O adapters (e.g., virtual I/O adapter 226) As a result, network resources may be assigned to a number of virtual machines running on the same host, allowing each virtual machine to communicate directly with the network hardware while still allowing sharing of the adapter between virtual machines. Secondary host 110B comprises MEM 355 which further comprises checkpoint application 276 and checkpoint data image 310B. Checkpoint data image 310B represents memory state and CPU state information and updates (collectively illustrated by checkpoint data 310A) associated with virtual machine 114A (at a previous checkpoint) that executes on primary host 110A.

HAC utility 250 also executes within primary host 110A or within HYP 225 (shown in FIG. 2) to provide checkpoint related functions/operations (facilitated by the network adapter 134) to enable/enhance high system availability via buffering of outgoing network packets 320. In order to provide checkpoint related functions, HAC utility 250 configures first VM 114A (e.g., via checkpoint application 360) to indicate whether checkpointing technology is employed by first VM 114A. As a result, HAC utility 250 receives configuration information 325 from VM 114A if checkpointing technology is being utilized by VM 114A.

HAC utility 250 initiates, at the primary host, performance of a checkpoint for a first virtual machine just before the transmission of outgoing network packet 320 by virtual machine 114 that previously indicated use of checkpointing technology. In another embodiment, initiation of a disk write is also used to initiate the performance of checkpoints. A network packet transmission or a disk write triggers execution of a checkpoint to prevent a secondary host that resumes execution from a previous/last checkpoint from having to re-transmit a packet or re-perform a disk write if a primary host 110A previously released a network packet or performed a disk write and failed. By initiating checkpoints through the network I/O and disk I/O, execution redundancies are eliminated as packet transmissions and disk writes that occurred after the last checkpoint are not repeated from either the primary or the secondary host. For example, in one embodiment, HAC utility 250 initiates the performance of the checkpoint immediately after the virtual machine performs the Hypervisor Call (HCALL) into the underlying hypervisor to transmit the network packet.

During the checkpoint, HAC utility 250 transmits CPU and memory state of the first VM on the primary host to the (second VM on) secondary host system (via checkpoint data 310A), including information regarding the virtual machine's "intention" to transmit a network packet. Checkpoint data 310A is copied as checkpoint data image 310B into memory 355 of secondary host 110B.

Referring again to the use of SR-IOV technology, the SR-IOV adapter (e.g., network interface/adapter 134) is aware of the existence of different virtual machines and the individual traffic originating from respective virtual machines. In a particular configuration example, each "virtual function"/virtual I/O adapter 226 can be assigned a different MAC address in order for the physical network adapter to route incoming packets to the correct/appropriate "virtual function"/virtual I/O adapter 226 and deliver interrupts to the correct/appropriate virtual machine. As a result, the SR-IOV adapter solution is critically different to conventional virtual network adapter approaches by which virtual machines proxy respective traffic through a single virtualization point (e.g. VIOS or a hypervisor) that "owns" the network adapter.

The SR-IOV network adapter (i.e., network adapter 134 being configured using SR-IOV technology 343) is capable of processing traffic from different virtual machines differently, and in particular, the SR-IOV network adapter through the use of HAC utility 250 allows virtual machines to indicate that these virtual machines are respectively using checkpointing technology. Receipt of indication of the use of checkpointing technology provides the adapter with further indication that a specific virtual machine "intends" to buffer outgoing network packets until checkpoints have been exchanged with the secondary host.

Network adapter 134 is either (a) configured with on-board memory (e.g., memory buffer 340) or (b) provided with access to system memory. Network adapter 134 uses memory to buffer outgoing network packets originating from virtual machines that previously indicated use of checkpointing technology. When a virtual machine indicates that a checkpoint is completed, network adapter 134 begins to send the buffered network packets for that VM out onto the network.

According to one embodiment, in order to minimize the latency that checkpointing adds to network transmission due to the buffering, network adapter 134 prioritizes buffered network packets (e.g., by using network packet priority information 335) over newly received network packets originating from non-checkpointing virtual machines. In one embodiment, the buffers (e.g., buffer 340) within network adapter 134 operate in a circular fashion, such that new network packets can be buffered at the same time that buffered network packets from a last checkpoint are being transmitted. If a buffer becomes full, a signal is sent (e.g., via broadcast) to the virtual machines that are currently configured to perform checkpointing to indicate that no more packet transmission can occur until a checkpoint is performed and the buffer can be emptied.

HAC utility 250 assigns to virtual machine 114A one or more of: (a) a dedicated buffer space; and (b) a global buffer (e.g., buffer 347) that enables storage of interleaved packets from checkpointing virtual machines. The global buffer enables automatic transmission of checkpointed traffic in an order in which the traffic is received. Furthermore, the global buffer is used to avoid placing a requirement on the network adapter to determine which one of a set of virtual machine checkpointing buffers 340 to empty first.

Figure 4:
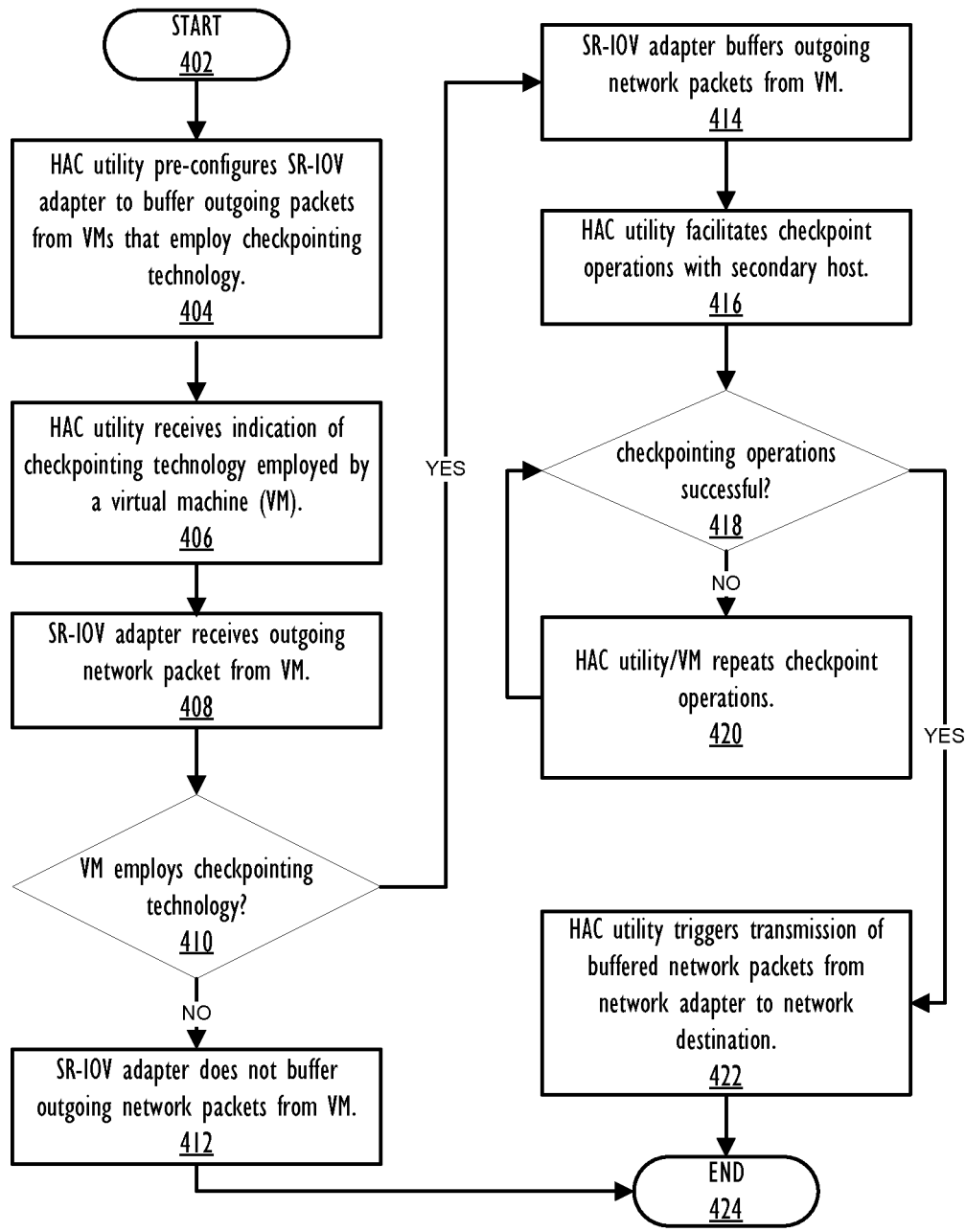
FIG. 4 is a high level logical flowchart of an exemplary method by which a virtual machine performs checkpoint operations in association with the use of hardware based buffering of network packets via a network adapter, according to one embodiment.
Figure 5:
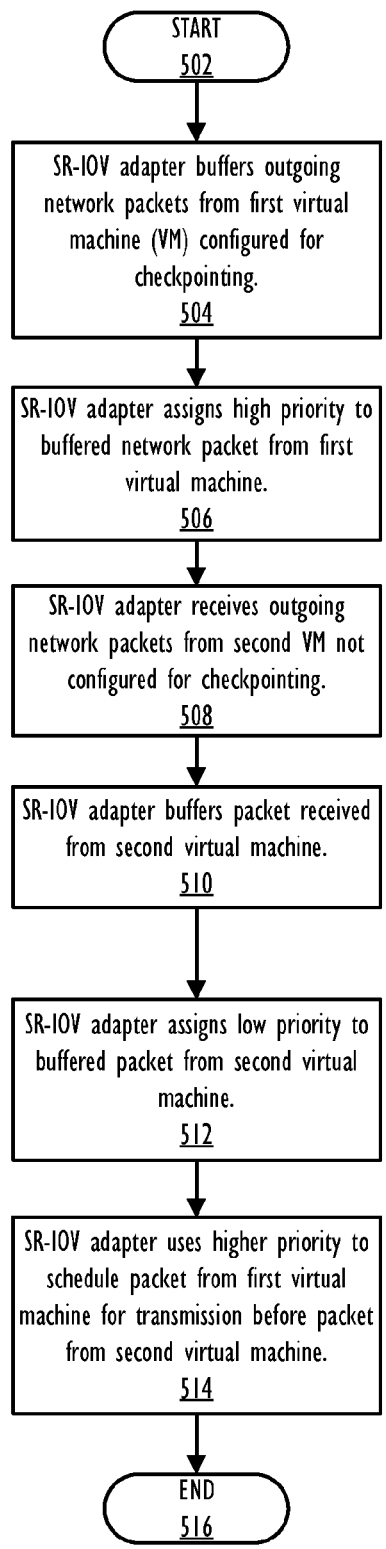
FIG. 5 is a high level logical flowchart of an exemplary method by which a primary host uses packet priority to schedule transmission of buffered network packets following checkpoint operations, according to one embodiment.

FIGS. 4 and 5 are flow charts illustrating the methods by which the above processes of the illustrative embodiment are completed. Although the method illustrated in FIGS. 4 and 5 may be described with reference to components and functionality illustrated by and described in reference to FIGS. 1-3, it should be understood that this is merely for convenience and alternative components and/or configurations thereof can be employed when implementing the various methods. Certain portions of the methods may be completed by HAC utility 250 executing on one or more (virtual) processors (CPU 231/206A) within VM 114 (FIG. 1 or 2) or by SR-IOV adapter 134. The executed processes then control specific operations of or on host devices 110, VMs 114 and SR-IOV adapter 134. For simplicity is describing the methods, all method processes are described from the perspective of either/both HAC utility 250 and SR-IOV adapter 134 and/or VM 114.

In FIG. 4 a virtual machine performs checkpoint operations in association with the use of hardware based buffering of network packets via the network adapter, according to one embodiment. The method begins at initiator block 402 and proceeds to block 404 at which HAC utility 250 pre-configures SR-IOV adapter 134 to buffer outgoing packets from virtual machines that employ checkpointing technology. For example, the various types of checkpointing technologies may be a collection of proprietary checkpoint software packages (using different communication protocols) from respective companies. In addition, the collection of proprietary software packages may include earlier and later versions (that have added/enhanced features) of checkpoint software from the same enterprise. At block 406, HAC utility 250 receives from a virtual machine running on a primary host, configuration information that provides an indication that the virtual machine employs checkpointing technology. At block 408, SR-IOV 134 receives an outgoing network packet from a virtual machine. At decision block 410, SR-IOV adapter 134 determines whether the outgoing network packet originates from a virtual machine that employs checkpointing technology. If at decision block 410, SR-IOV adapter 134 determines that the outgoing network packet does not originate from a virtual machine that employs checkpointing technology, SR-IOV adapter 134 does not buffer the outgoing network packet, as shown at block 412. However, if at decision block 410, SR-IOV adapter 134 determines that the outgoing network packet does originate from a virtual machine that employs checkpointing technology, SR-IOV adapter 134 buffers the outgoing network packet, as shown at block 414. In one embodiment, HAC utility 250 pre-assigns to the network adapter on the primary host one or more of: (a) an allocation of on-board memory; and (b) access to system memory. The allocation of on-board memory or access to system memory is utilized to buffer outgoing network packets originating from the virtual machine that previously indicated use of checkpointing technology. Additionally, at block 416, a primary host (associated with the checkpointing virtual machine) through the use of HAC utility 250 initiates/facilitates a set of checkpoint operations with a secondary host. At decision block 418, HAC utility 250 determines whether the checkpoint operations are successfully completed. If at decision block 418 HAC utility 250 determines that the checkpoint operations are not successfully completed, the process moves to block 420 at which the primary host re-attempts/repeats the checkpoint operations with the secondary host.

However, in response to the checkpoint operations being successfully completed, HAC utility 250 triggers release/transmission of the buffered network packets from the network adapter to a destination within a corresponding network, as shown at block 422. In one embodiment, HAC utility 250 assigns a higher priority to the buffered network packet and assigns a lower priority to a network packet that currently originates from a different virtual machine which does not employ checkpointing technology. HAC utility 250 assigns this higher priority to the buffered network packets to minimize network latency. The process ends at block 424.

In FIG. 5 a primary host uses packet priority to schedule transmission of buffered network packets following checkpoint operations, according to one embodiment. The method begins at initiator block 502 and proceeds to block 504 at which SR_IOV adapter 134 buffers first outgoing network packets from a first virtual machine that is configured for checkpointing. At block 506, SR_IOV adapter 134 assigns a high priority to the buffered, first network packet from the first virtual machine. At block 508, SR-IOV adapter 134 receives second outgoing network packets from a second virtual machine that is not configured for checkpointing. At block 510, SR_IOV adapter 134 buffers the second network packet from the second virtual machine. At block 512, SR_IOV adapter 134 assigns a low priority to the second buffered network packet from the second virtual machine. At block 514, SR_IOV adapter 134 schedules the first buffered network packet from the first virtual machine for transmission (following a successful completion of checkpoint operations associated with the first virtual machine) before the second buffered network packet from the second virtual machine, based on a higher priority of the first buffered network packet. The process ends at block 516.

The flowchart and block diagrams in the various figures presented and described herein illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the flow chart above, one or more of the methods are embodied in a computer readable medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method performed in a data processing system having a processor, a memory coupled to the processor, at least one input/output (I/O) adapter that enables connection to an external network, and a virtualization management component executing within the data processing system that generates a plurality of operating system (OS) partitions, the method comprising:

preconfiguring, before transmission of one or more outgoing network packets from a first virtual machine of a plurality of virtual machines on a primary host, a physical network adapter of the data processing system to buffer outgoing packets of virtual machines employing a checkpointing technology, wherein the physical network adapter is configured with Single Root IO Virtualization technology (i.e., SR-IOV), wherein the physical network adapter is represented to the primary host as a plurality of virtual input/output (I/O) adapters, wherein each virtual I/O adapter of the plurality of virtual I/O adapters is assigned to a virtual machine of the plurality of virtual machines, and wherein each virtual machine of the plurality of virtual machines of the plurality of virtual I/O adapters is assigned a unique media access control (MAC) address;

receiving, from one or more virtual machines of the plurality of virtual machines, configuration information associated with the one or more virtual machines that provides an indication that the one or more virtual machines employ a checkpointing technology;

receiving, at the physical network adapter, the one or more outgoing network packets originating from a first virtual machine on the primary host;

in response to receiving the one or more outgoing network packets from the first virtual machine, the physical network adapter:

determining whether the first virtual machine employs the checkpointing technology; and in response to determining the first virtual machine employs the checkpointing technology, buffering the one or more outgoing network packets from the first virtual machine within a dedicated buffer at the physical network adapter;

the physical network adapter receiving a notification that a checkpointing operation has successfully completed; and in response to the physical network adapter receiving a notification that the checkpointing operation has successfully completed, triggering, using a checkpoint command, transmission of the buffered one or more outgoing network packets from the physical network adapter to a destination within a corresponding network;

wherein the physical network adapter is aware of the existence of the plurality of virtual machines and individual traffic originating from the plurality of virtual machines.

2. The method of claim 1, further comprising:

facilitating a performance of the checkpointing operation in which state information of the first virtual machine is synchronized at a second virtual machine on a secondary host, said the facilitating further comprising:

forwarding memory and CPU state information associated with the first virtual machine to the second virtual machine on the secondary host, wherein the secondary host is selected to be utilized as a backup in the event of failure of the primary host; and providing an indication of an expected transmission of the one or more outgoing network packets to the secondary host; and in response to the first virtual machine performing a hypervisor call, initiating performance of the checkpointing operation;

wherein the facilitating of the performance of the checkpointing operation occurs responsive to one of: initiation of a disk write or transmission of a network packet.

3. The method of claim 1, further comprising:

assigning a higher priority to buffered network packets that originated from a virtual machine that employs the checkpointing technology, wherein a higher priority assigned to the buffered network packets minimizes network latency;

assigning a lower priority to network packets that originate from a different virtual machine that does not employ the checkpointing technology; and determining packet transmission scheduling of a network packet based on a priority assigned to the network packet.

4. The method of claim 1, wherein the buffering further comprises:

pre-assigning, to the physical network adapter on the primary host, at least one of an allocation of an on-board memory and access to a system memory; and in response to determining that the first virtual machine employs the checkpointing technology, utilizing the at least one of the allocation of the on-board memory and the access to the system memory to buffer the one or more outgoing network packets originating from the first virtual machine.

5. The method of claim 1, further comprising:

assigning to the first virtual machine one or more of: a dedicated buffer space and a global buffer that enables storage of interleaved packets from multiple checkpointing virtual machines, wherein the global buffer enables automatic transmission of buffered network packets in an order in which the buffered network packets are received, and wherein the global buffer is used to avoid placing a requirement on the physical network adapter to determine which one of a set of virtual machine checkpointing buffers to empty first.

6. The method of claim 1, further comprising:

configuring a plurality of buffers associated with the physical network adapter to provide a circular operation by which one or more new network packets are allowed to be buffered at a same time that one or more buffered network packets from a previously executed checkpointing operation is being transmitted;

detecting when at least one buffer from the plurality of buffers becomes full; and in response to the at least one buffer becoming full, sending a notification to one or more virtual machines that employ the checkpointing technology that indicates to the one or more virtual machines that employ the checkpointing technology that further packet transmission is halted until another checkpointing operation is completed, wherein completion of the another checkpointing operation allows the plurality of buffers to be emptied.

7. A data processing device comprising:

a processor;

an input/output (I/O) interface coupled to an external network;

a physical network adapter implementing Single Root Input/Output Virtualization Technology (SR-IOV) technology; and a memory coupled to the processor that memory includes:

a hypervisor;

a checkpoint application;

a plurality of operating system (OS) partitions;

a plurality of virtual machines (VMs); and a utility that when executed on the processor enables the physical network adapter to:

preconfigure, before transmission of one or more outgoing network packets from a first virtual machine of a plurality of virtual machines on a primary host, the physical network adapter of the data processing system to buffer outgoing packets of virtual machines employing a checkpointing technology, wherein the physical network adapter is represented to the primary host as a plurality of virtual input/output (I/O) adapters, wherein each virtual I/O adapter of the plurality of virtual I/O adapters is assigned to a virtual machine of the plurality of virtual machines, wherein each virtual machine of the plurality of virtual machines of the plurality of virtual I/O adapters is assigned a unique media access control (MAC) address;

receive, from one or more virtual machines of the plurality of virtual machines, configuration information associated with the one or more virtual machines that provides an indication that the one or more virtual machines employ a checkpointing technology;

receive at the physical network adapter the one or more outgoing network packets originating from a first virtual machine on the primary host;

in response receiving the one or more outgoing network packets from the first virtual machine:
  determine whether the first virtual machine employs the checkpointing technology; and
  in response to determining the first virtual machine employs the checkpointing technology, buffer the one or more outgoing network packets from the first virtual machine within a dedicated buffer at the physical network adapter;

receive a notification that a checkpointing operation has successfully completed; and in response receiving the notification that the checkpointing operation has successfully completed, trigger, using a checkpoint command, transmission of the buffered one or more outgoing network packets from the physical network adapter to a destination within a corresponding network;

wherein the physical network adapter is aware of the existence of the plurality of virtual machines and individual traffic originating from the plurality of virtual machines.

8. The data processing device of claim 7, the utility further comprising functions that enable the physical network adapter to:
  facilitate a performance of the checkpointing operation in which state information of the first virtual machine is synchronized at a second virtual machine on a secondary host, by:
    forwarding memory and CPU state updates associated with the first virtual machine to the second virtual machine on the secondary host, wherein the secondary host is selected to be utilized as a backup in the event of failure of the primary host; and
    providing an indication of an expected transmission of the one or more outgoing network packets to the secondary host; and
  in response to the first virtual machine performing a hypervisor call, initiate performance of the checkpointing operation;
  wherein the facilitating of the performance of the checkpointing operation occurs responsive to one of: initiation of a disk write or transmission of a network packet.

9. The data processing device of claim 7, the utility further comprising functions that enable the physical network adapter to:
  assign a higher priority to buffered network packets that originated from a virtual machine that employs the checkpointing technology, wherein a higher priority assigned to the buffered network packets minimizes network latency;
  assign a lower priority to network packets that originate from a different virtual machine that does not employ the checkpointing technology; and
  determine packet transmission scheduling of a network packet based on a priority assigned to the network packet.

10. The data processing device of claim 7, wherein the functions to buffer further comprises functions to:
  pre-assign to the physical network adapter on the primary host, at least one an allocation of an on-board memory and access to a system memory; and
  in response to determining the virtual machine employs the checkpointing technology, utilize the at least one of the allocation of the on-board memory and the access to the system memory to buffer the one or more outgoing network packets originating from the first virtual machine.

11. The data processing device of claim 7, said utility further comprising functions to:
  assign to the first virtual machine one or more of: a dedicated buffer space and a global buffer that enables storage of interleaved packets from multiple checkpointing virtual machines, wherein the global buffer enables automatic transmission of buffered network packets in an order in which the buffered network packets are received, and wherein the global buffer is used to avoid placing a requirement on the physical network adapter to determine which one of a set of virtual machine checkpointing buffers to empty first.

12. The data processing device of claim 7, said utility further comprising functions to:
  configure a plurality of buffers associated with the physical network adapter to provide a circular operation by which one or more new network packets are allowed to be buffered at a same time that one or more buffered network packets from a previously executed checkpointing operation is being transmitted;
  detect when at least one buffer from the plurality of buffers becomes full; and
  in response to the at least one buffer becoming full, send a notification to one or more virtual machines that employ the checkpointing technology that indicates to the one or more virtual machines that employ the checkpointing technology that further packet transmission is halted until another checkpointing operation is completed, wherein completion of the another checkpointing operation allows the plurality of buffers to be emptied.

13. A computer program product comprising:
a non-transitory computer readable storage device; and
program code on the non-transitory computer readable storage device that when executed by a processor within a data processing system enables a physical network adapter of data processing system to perform a functions comprising:
  preconfiguring, before transmission of one or more outgoing network packets from a first virtual machine of a plurality of virtual machines on a primary host, the physical network adapter of the data processing system to buffer outgoing packets of virtual machines employing a checkpointing technology, wherein the physical network adapter is configured with Single Root IO Virtualization technology (i.e., SR-IOV), wherein the physical network adapter is represented to the primary host as a plurality of virtual input/output (I/O) adapters, wherein each virtual I/O adapter of the plurality of virtual I/O adapters is assigned to a virtual machine of the plurality of virtual machines, and wherein each virtual machine of the plurality of virtual machines of the plurality of virtual I/O adapters is assigned a unique media access control (MAC) address;
  receiving, from one or more virtual machines of the plurality of virtual machines, configuration information associated with the one or more virtual machines that provides an indication that the one or more virtual machines employ a checkpointing technology;
receiving the one or more outgoing network packets originating from a first virtual machine on the primary host;
in response to receiving the one or more outgoing network packets from the first virtual machine, the physical network adapter:
  determining whether the first virtual machine employs the checkpointing technology; and
  in response to determining the first virtual machine employs the checkpointing technology, buffering the one or more outgoing network packets from the first virtual machine within a dedicated buffer at the physical network adapter;
receiving a notification that the checkpointing operation has successfully completed; and
in response to the physical network adapter receiving the notification that the checkpointing operation has successfully completed, triggering, using a checkpoint command, transmission of the buffered one or more outgoing network packets from the physical network adapter to a destination within a corresponding network;
wherein the physical network adapter is aware of the existence of the plurality of virtual machines and individual traffic originating from the plurality of virtual machines.

14. The computer program product of claim 13, the program code further comprising program code for:
facilitating a performance of the checkpointing operation in which a state information of the first virtual machine is synchronized at a second virtual machine on a secondary host, the facilitating further comprising:
  forwarding memory and CPU state updates associated with the virtual machine to the second virtual machine on the secondary host, wherein the secondary host is selected to be utilized as a backup in the event of failure of the primary host; and
  providing to the an indication of an expected transmission of the one or more outgoing network packets to the secondary host; and
in response to the first virtual machine performing a hypervisor call, initiating performance of the checkpointing operation;
wherein the facilitating of the performance of the checkpointing operation occurs responsive to one of: initiation of a disk write or transmission of a network packet.

15. The computer program product of claim 13, the program code further comprising program code for:
assigning a higher priority to buffered network packets that originated from a virtual machine employs the employ checkpointing technology, and assigning a lower priority to network packets that originate from a different virtual machine that does not employ the checkpointing technology, wherein a higher priority assigned to the buffered network packets minimizes network latency;
determining packet transmission scheduling of a network packet based on a priority assigned to the network packet;
pre-assigning, to the physical network adapter on the primary host, at least one of an allocation of an on-board memory and access to a system memory; and
in response to determining the first virtual machine employs the checkpointing technology, utilizing the at least one of the allocation of the on-board memory and the access to the system memory to buffer the one or more outgoing network packets originating from the first virtual machine.

16. The computer program product of claim 13, the program code further comprising program code for:
assigning to the first virtual machine a dedicated buffer space;
configuring a plurality of buffers associated with the physical network adapter to provide a circular operation by which one or more new network packets are allowed to be buffered at a same time that one or more buffered network packets from a previously executed checkpointing operation is being transmitted;
detecting when at least one buffer from the plurality of buffers becomes full; and
in response to the at least one buffer becoming full, sending a notification to one or more virtual machines that employ the checkpointing technology that indicates to the one or more virtual machines that employ the checkpointing technology that further packet transmission is halted until another checkpointing operation is completed, wherein completion of the another checkpointing operation allows the plurality of buffers to be emptied.

17. The method of claim 1, wherein the physical network adapter routes incoming packets and interrupts directly to each of the plurality of virtual I/O adapters using the unique MAC address associated with each of the respective plurality of virtual I/O adapters.

18. The method of claim 2, wherein the configuration information further provides an indication to the physical network adapter that the one or more virtual machines intend to buffer the one or more outgoing network packets until one or more checkpoints have been exchanged with the secondary host.

19. The data processing device of claim 7, wherein:
the physical network adapter routes incoming packets and interrupts directly to each of the plurality of virtual I/O adapters using the unique MAC address associated with each of the respective plurality of virtual I/O adapters; and
the configuration information further provides an indication to the physical network adapter that the one or more virtual machines intend to buffer the one or more outgoing network packets until one or more checkpoints have been exchanged with a secondary host.

20. The computer program product of claim 13, wherein:
the physical network adapter routes incoming packets and interrupts directly to each of the plurality of virtual I/O adapters using the unique MAC address associated with each of the respective plurality of virtual I/O adapters; and
the configuration information further provides an indication to the physical network adapter that the one or more virtual machines intend to buffer the one or more outgoing network packets until one or more checkpoints have been exchanged with a secondary host.

* * * * *